(12) United States Patent
Sasaki et al.

(10) Patent No.: US 7,088,663 B2
(45) Date of Patent: Aug. 8, 2006

(54) INFORMATION RECORDING APPARATUS AND INFORMATION RECORDING METHOD

(75) Inventors: Yoshio Sasaki, Saitama (JP); Masatoshi Adachi, Saitama (JP); Hiroyuki Uchino, Saitama (JP); Yasuhiko Tominaga, Saitama (JP)

(73) Assignee: Pioneer Corporation, Tokyo (JP)

( * ) Notice: Subject to any disclaimer, the term of this patent is extended or adjusted under 35 U.S.C. 154(b) by 418 days.

(21) Appl. No.: 10/443,871

(22) Filed: May 23, 2003

(65) Prior Publication Data
US 2004/0047255 A1    Mar. 11, 2004

(30) Foreign Application Priority Data
May 27, 2002  (JP) ............................. 2002-152038
Apr. 10, 2003  (JP) ............................. 2003-106903

(51) Int. Cl.
*G11B 7/125* (2006.01)
(52) U.S. Cl. ..................... 369/59.11; 369/116
(58) Field of Classification Search ............ 369/59.11, 369/116, 13.26
See application file for complete search history.

(56) References Cited
U.S. PATENT DOCUMENTS
4,939,717 A * 7/1990 Ohno et al. ................. 369/116

6,256,277 B1   7/2001 Saga et al.
6,343,056 B1 * 1/2002 Miyamoto et al. ....... 369/59.11

FOREIGN PATENT DOCUMENTS
EP   0 978 827 A2   2/2000
EP   1 026 671 A1   8/2000

* cited by examiner

*Primary Examiner*—Wayne Young
*Assistant Examiner*—Van T. Pham
(74) *Attorney, Agent, or Firm*—Young & Thompson

(57) ABSTRACT

The apparatus records information by irradiating a laser beam onto a recording medium and forming marks on the disc. Prior to the actual recording, the controller performs a test recording in which predetermined test recording data is recorded on the recording medium. In the test, data is recorded by generating a recording pulse signal based on the recording data and thereby driving a light source. While the test recording is performed, the level of a cooling pulse in the recording pulse signal is varied. Then, the test recorded data is reproduced to generate a reproduced signal. A waveform of the reproduced signal is evaluated, and a cooling level that provides a target asymmetry value is set as an optimum cooling level. Thus, the subsequent actual recording can be performed according to the optimum cooling level determined based on characteristics of the recording medium to be used for the actual recording.

7 Claims, 9 Drawing Sheets

INFORMATION RECORDING APPARATUS AND INFORMATION RECORDING METHOD

BACKGROUND OF THE INVENTION

1. Field of the Invention

This invention relates to a technique for recording information on an optical disc using a laser beam or other means.

2. Description of Related Art

Onto a recordable or rewritable optical disc such as a DVD-R (DVD-Recordable) or a DVD-RW (DVD-Rerecordable), information is recorded by irradiating a laser beam on its recording surface. At the areas on the recording surface of the optical disc where the laser beam is irradiated, the property of the optical recording medium forming the optical disc is physically changed because of the increased temperature. This produces recording marks on the recording surface.

Namely, the laser beam is modulated by recording pulses having time widths corresponding to information to be recorded, so that the laser pulses having lengths corresponding to information to be recorded are generated and irradiated on the optical disc. Thus, recording marks having lengths corresponding to the information to be recorded can be formed on the optical disc.

One approach recently used is to form a recording mark by a pulse train having a plurality of short pulses, rather than by a single laser pulse. This approach, called "write strategy", introduces less heat accumulation on the recording surface of the optical disc compared to the approach irradiating a single recording laser pulse. Therefore, uniform temperature distribution can be achieved on the recording surface on which the recording marks are formed. This can prevent undesired teardrop-shaped recording marks from being formed, and enables the formation of the recording marks of preferred shape.

In the case of DVD-R, for example, the recording pulse train consists of a plurality of pulses which magnitude varying between a read power level and a write power level. That is, based on recording data, the areas on the recording surface of the optical disc where no recording marks are to be formed (referred to as "space periods" hereafter) are irradiated with the laser beam of the read power. The areas on the recording surface of the optical disc where recording marks are to be formed (referred to as "mark periods" hereafter) are irradiated with the laser beam of the power corresponding to the recording pulse train having magnitudes varying between the read power and the write power. Consequently, the recording marks are formed on the recording surface. In the case of DVD-RW, the recording pulse train has a waveform with amplitudes varying between four power levels: the read power level, an erase power level for erasing the recorded mark already formed, the write power level, and a cooling power level (typically equal to the read power level).

Such discs are manufactured by various manufacturers and have different characteristics on a manufacturer basis or even a product basis. Therefore, there are differences in optimum recording power and write strategy used in recording information between the discs. Generally, each disc has information on the recording power and the write strategy reflecting its own characteristics (hereafter referred to as "recording condition information"), which is considered to be optimum. In one approach, this recording condition information is included in LPP (Land Pre-Pit) information and recorded on the disc as the LPPs. In another approach, the recording condition information is stored in a microcomputer of a recording apparatus. In this case, a manufacturer ID is recorded on the disc, whereas the recording condition information is stored in the microcomputer of the recording apparatus in association with the manufacturer ID. Thus, when the recording apparatus records information on the disc, it reads out the recording condition information in the LPP information or retrieves the recording condition information corresponding to the manufacturer ID recorded on the disc from the microcomputer in itself, and then records the information according to the recording condition information. This allows the information to be recorded under the recording condition recommended by the disc manufacturer or the like.

While these approaches to determine the recording condition allow information to be recorded substantially properly on a disc when the disc has a sufficiently wide margin (tolerance) in its characteristics, the quality of actually recorded signals still varies to some extent. This results from variations in each information recording apparatus, such as an error in laser power adjustment and the pulse emission characteristic during recording, or variations in characteristics of each disc. If the recording speed further increases in the future, the margin in characteristic of the disc, that is sufficiently wide for a normal recording speed, will be relatively narrow, so that proper recording may become difficult or impossible. In addition, discs with various characteristics manufactured by different manufacturers will be commercially available as DVD-RW becomes popular. Some of the discs may have a narrow margin, and it is quite possible that the proper information recording is not ensured for such discs.

SUMMARY OF THE INVENTION

The invention is made from these viewpoints. The object of the invention is to provide an information recording apparatus and information recording method that always allow information to be recorded under an optimum condition even in a case of high speed recording or in a case that a disc having a small margin is used.

According to one aspect of the present invention, there is provided an information recording apparatus for irradiating a recording medium with a laser beam and forming recording marks corresponding to recording data, the apparatus including: a light source which emits the laser beam; and a control unit which generates a recording pulse signal based on the recording data and drives the light source to irradiate laser pulses onto the recording medium. The control unit includes: a test recording unit which records predetermined test recording data while varying a cooling level, the cooling level being a level of a cooling pulse; a reproduction unit which reproduces test recorded data and generates a reproduced signal; and a setting unit which determines a cooling level that provides a target asymmetry value based on a waveform of the reproduced signal and sets the cooling level as an optimum cooling level.

This information recording apparatus records information by irradiating the laser beam onto the recording medium such as a DVD-RW and forming the recording marks on the disc. Prior to the actual recording, the control unit performs a test recording in which the predetermined test recording data is recorded on the recording medium. In the test recording, the data is recorded by generating the recording pulse signal based on the recording data and driving the light source. While the test recording is performed, the level of the cooling pulse in the recording pulse signal is varied. Then, the test recorded data is reproduced to generate the reproduced signal. The waveform of the reproduced signal is evaluated, and the cooling level that provides the target asymmetry value is set as the optimum cooling level. Thus, the subsequent actual recording can be performed according to the optimum cooling level determined based on characteristics of the recording medium to be used for the actual recording.

The information recording apparatus may further include an obtaining unit which obtains recording condition information provided for the recording medium, and the test recording unit may record the test recording data by using the recording pulse signal having a cooling pulse width wider than a cooling pulse width specified in the recording condition information. In this case, the recording condition information, provided for the recording medium to be used, is obtained from the disc or obtained based on an ID, such as a manufacturer ID, recorded on the disc. The test recording is then performed by using the recording pulse signal having the cooling pulse width wider than the cooling pulse width specified in the obtained recording condition information thus obtained. Therefore, if the optimum cooling level to be ultimately determined is not equal to the cooling level specified in the recording condition information, the optimum cooling level can be successfully determined because the test recording is performed with the varied cooling pulse level.

The test recording unit may alternately record sections of recording data of a short mark/short space and sections of recording data of a long mark/long space as the test recording data. This allows evaluation of effects of the varied cooling level on the data of each mark length.

The setting unit may include: a β value computation unit which computes β values from the waveform of the reproduced signal; a storage unit which stores correlations between the β values and asymmetry values; and a unit for determining a cooling level that provides a target asymmetry value as the optimum cooling level based on the computed β values and the correlations. Thus, the optimum cooling level that provides the target asymmetry value can be determined without using recording data of all mark/space lengths in the test recording.

In a preferred example, the β value computation unit may compute the β value based on a center level of the reproduced signal waveform for the recorded data of the short mark/short space and a center level of the reproduced signal waveform for the recorded data of the long mark/long space. Also, the recording data of the short mark/short space may be recording data of a shortest mark/shortest space, and the recording data of the long mark/long space may be recording data of a mark/space having a length that allows its signal level to reach a maximum amplitude without causing distortion.

The test recording unit may record recording data that includes marks/spaces of 3T to 11T and 14T as the test recording data, and the setting unit may include: a unit for computing asymmetry values from the waveform of the reproduced signal; and a unit for determining a cooling level at which a computed asymmetry value matches the target asymmetry value as the optimum cooling level. Thus, the test data of all mark/space lengths of 3T to 11T and 14T is recorded and reproduced for computation of the asymmetry values, and the cooling level that provides the target asymmetry value is determined. This allows accurate determination of the optimum cooling level.

The test recording unit may vary the cooling level from a lower value to a higher value. Performing the test recording from a lower cooling level in this manner means that the test recording begins with a deep asymmetry. This facilitates the start of reading the test-recorded data.

The test recording unit may perform the test recording without varying the cooling level during an initial period of a first predetermined length in the test recording data. In that case, in the initial period in the test recording data recorded without variation in the cooling level, data for a period of a second predetermined length shorter than the first predetermined length is not used for determination of the optimum cooling level. This allows the test recorded data to be evaluated without being affected by a transient response that may be caused in reproduction of the initial part of the test recorded data.

Preferably, the recording medium is a DVD-RW, and the test recording unit records the test recording data within PCA of the DVD-RW in order from a border between the PCA and RMA toward inner tracks. This allows the PCA to be effectively used in the test recording.

According to another aspect of the present invention, there is provide an information recording method for irradiating a laser beam onto a recording medium and forming recording marks corresponding to recording data, the method including: a test recording step of recording predetermined test recording data while varying a cooling level, the cooling level being a level of a cooling pulse; a reproduction step of reproducing test recorded data and generating a reproduced signal; a setting step of determining a cooling level that provides a target asymmetry value based on a waveform of the reproduced signal and setting the cooling level as an optimum cooling level; and an information recording step of recording information on the recording medium by generating, based on recording data, a recording pulse signal including the cooling pulse that is set to the optimum cooling level and by driving a light source.

According to this information recording method, the information is recorded by irradiating the laser beam onto the recording medium such as a DVD-RW and forming the recording marks on the disc. Prior to the actual recording, a test recording is performed in which the predetermined test recording data is recorded on the recording medium. In the test recording, the data is recorded by generating the recording pulse signal based on the recording data and thereby driving the light source. While the test recording is performed, the level of the cooling pulse in the recording pulse signal is varied. Then, the test recorded data is reproduced to generate the reproduced signal. The waveform of the reproduced signal is evaluated, and the cooling level that provides the target asymmetry value is set as the optimum cooling level. Thus, the subsequent actual recording can be performed according to the optimum cooling level determined based on characteristics of the recording medium to be used for the actual recording.

The nature, utility, and further features of this invention will be more clearly apparent from the following detailed description with respect to preferred embodiment of the invention when read in conjunction with the accompanying drawings briefly described below.

DETAILED DESCRIPTION OF THE PREFERRED EMBODIMENTS

The invention involves determining an optimum recording condition by performing a test recording before recording actual information on a DVD-RW. The recording condition is determined by performing the test recording with varying the level of the cooling pulse in a recording pulse signal and thereby obtaining a cooling pulse level that provides an optimum value of asymmetry for a reproduced waveform of the recorded signal.

Now, preferred embodiments of the invention will be described below with reference to the drawings.

[Configuration of Apparatus]

Figure 1:
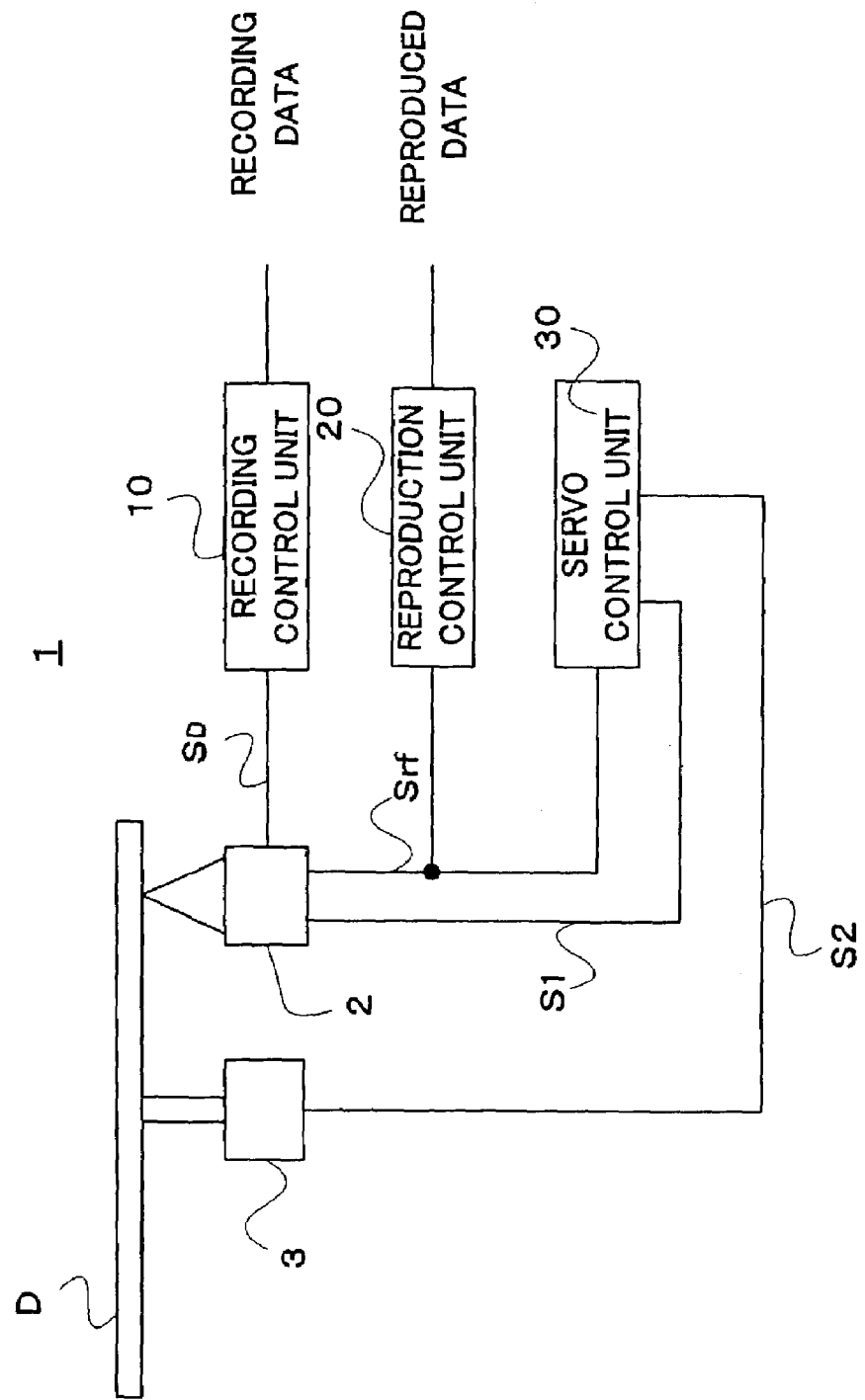
FIG. 1 is a block diagram showing a schematic configuration of an information recording and reproducing apparatus to which the invention is applied.

First, a configuration of an information recording and reproducing apparatus to which the invention is applied will be described. FIG. 1 schematically shows an entire configuration of the information recording and reproducing apparatus according to the embodiment of the invention. The information recording and reproducing apparatus 1 records information on an optical disc D and reproduces information from the optical disc D. For example, the optical disc D may be a DVD-RW that allows for repeated erasure and recording.

The information recording and reproducing apparatus 1 includes an optical pickup 2 for irradiating a recording beam and a reproduction beam onto the optical disc D, a spindle motor 3 for controlling rotation of the optical disc D, a recording control unit 10 for controlling recording of information on the optical disc D, a reproduction control unit 20 for controlling reproduction of information recorded on the optical disc D, and a servo control unit 30 for various kinds of servo control. The servo control includes a spindle servo for controlling rotation of the spindle motor 3, and a focus servo and a tracking servo for controlling a relative position of the optical pickup 2 to the optical disc D.

The recording control unit 10 receives recording data. Then, according to processing described later, the recording control unit 10 generates a driving signal $S_D$ for driving a laser diode in the optical pickup 2 and supplies the driving signal $S_D$ to the optical pickup 2.

The reproduction control unit 20 receives a read RF signal Srf output from the optical pickup 2, and performs predetermined processing on the read RF signal Srf, such as demodulation and decoding, to generate and output reproduced data.

The servo control unit 30 receives a read out signal Srf from the optical pickup 2. Based on the signal Srf, the servo control unit 30 supplies a servo signal S1 such as a tracking error signal or a focus error signal to the optical pickup 2, and supplies a spindle servo signal S2 to the spindle motor 3. Thus, various kinds of servo processing are performed, such as the tracking servo, the focus servo, and the spindle servo.

Since the invention mainly relates to the recording operations in the recording control unit 10 and various known methods can be applied to the reproduction control and the servo control, these controls will not be described in detail.

In addition, although FIG. 1 illustrates the information recording and reproducing apparatus as an embodiment of the invention, the invention may also be applied to an information recording apparatus dedicated to recording.

Figure 2:
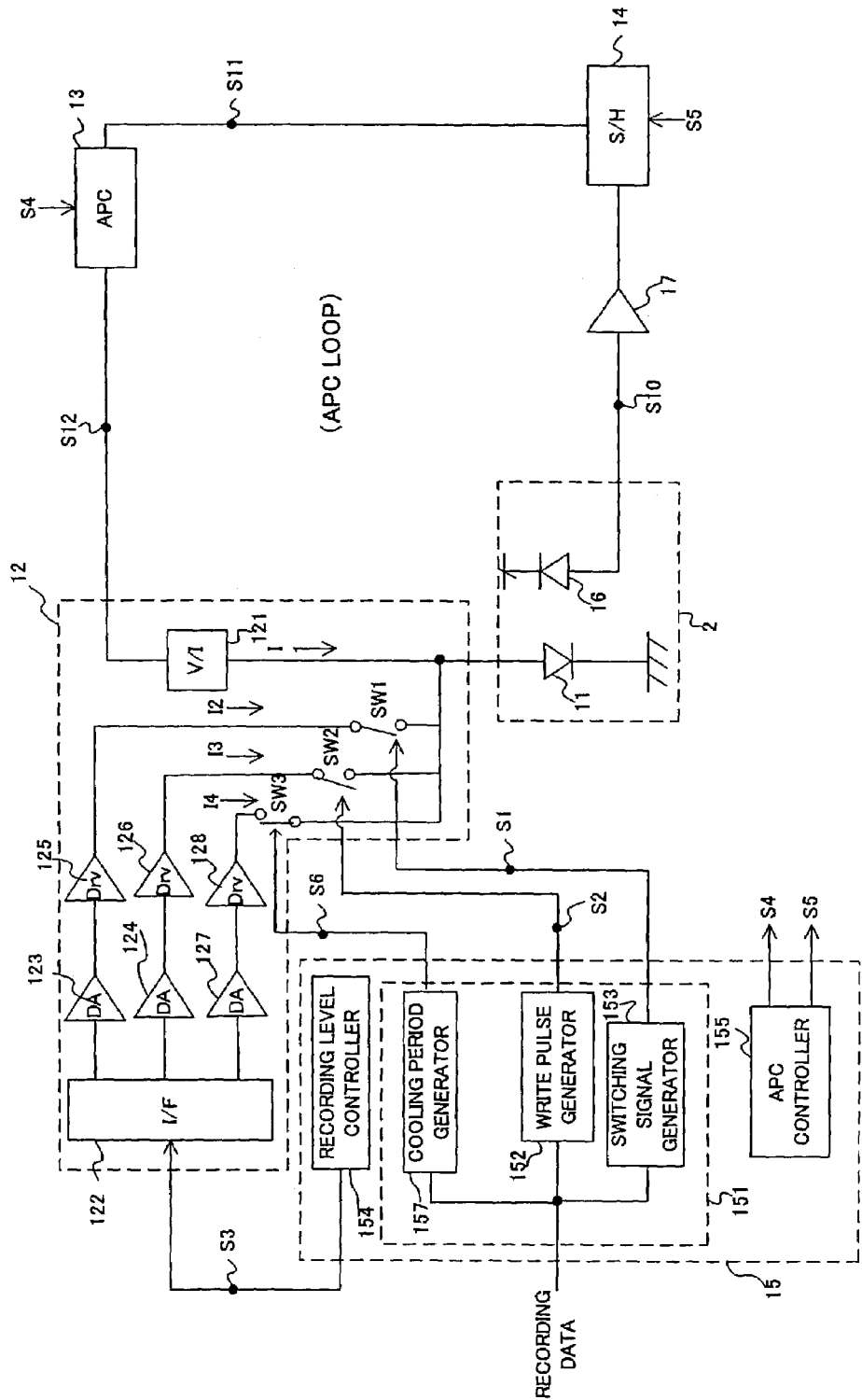
FIG. 2 is a block diagram showing a configuration of a recording controller shown in FIG. 1.

FIG. 2 shows an internal configuration of the optical pickup 2 and the recording control unit 10. As shown in FIG. 2, the optical pickup 2 includes a laser diode (LD) 11 that generates the recording beam for recording information on the optical disc D and the reproduction beam for reproducing information from the optical disc D. The optical pickup 2 also includes a front monitor diode (FMD) 16 that receives the laser beam emitted by the laser diode 11 and outputs a laser power level signal S10 corresponding to the laser beam.

It is noted that the optical pickup 2 further includes known components, which will not be shown or described in detail. These components include an optical detector for receiving a reflection beam of the reproduction beam reflected from the optical disc D and generating the read RF signal Srf, and an optical system for guiding the recording and reproduction beams and the reflection beam to appropriate directions.

The recording control unit 10 includes a laser diode (LD) driver 12, an APC (Automatic Power Control) circuit 13, a sample-and-hold (S/H) circuit 14, a controller 15, and a buffer 17.

The LD driver 12 supplies the laser diode (LD) 11 with a current corresponding to the recording data and causes information to be recorded on the optical disc D. As shown in FIG. 2, the LD driver 12 includes a voltage-to-current (V/I) converter 121, an interface (I/F) 122, D/A converters 123, 124 and 127, drivers 125, 126 and 128, and switches SW1 to SW3.

The sample-and-hold circuit 14 samples and holds the level of the laser power level signal S10 at the timing determined by a sample-and-hold signal S5.

The APC circuit 13 controls the power of the LD driver 12 based on a signal S11 output from the sample-and-hold circuit 14. Specifically, the APC circuit 13 controls the LD driver 12 so that the erase power level Pe or the read power level Pr of the laser beam is maintained constant.

The controller 15 mainly performs recording operations and APC control. As shown in FIG. 2, the controller 15 includes a switching controller 151, a recording level controller 154, and an APC controller 155.

The switching controller 151 includes a write pulse generator 152, a switching signal generator 153 and a cooling period generator 157, and generates switching signals S1, S2 and S6 for the switches SW1, SW2 and SW3 in the LD driver 12 based on the recording data input to the controller 15.

The recording level controller 154 generates a recording level signal S3 for determining a power level such as the read power level Pr, the write power level Pw and the erase power level Pe, and supplies the recording level signal S3 to the I/F 122 in the LD driver 12.

The APC controller 155 generates an APC target value S4 as a target value for servo control performed by the APC loop and supplies it to the APC circuit 13. The APC controller 155 also supplies the sample-and-hold circuit 14 with the sample-and-hold signal S5 that indicates the timings of sampling and holding by the sample-and-hold circuit 14.

Although this configuration employs the sample-and-hold circuit 14 to form the APC loop, a bottom hold circuit may be employed instead of the sample-and-hold circuit 14. In that case, the APC servo may be performed by using a bottom value of the laser power signal S10 output from the front monitor diode 16.

[Recording Pulse Waveform]

Figure 3A:
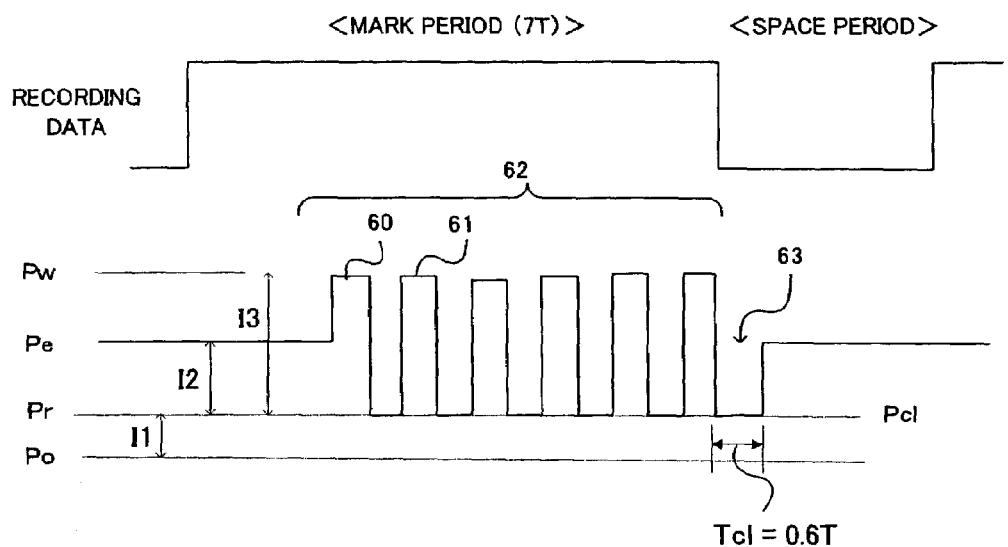
FIGS. 3A and 3B are waveform diagrams showing exemplary recording data waveforms.

Now, a recording pulse waveform used in the information recording and reproducing apparatus of the invention will be described. FIG. 3A shows an exemplary recording pulse waveform to which a so-called multi-pulse type write strategy is applied.

As shown in FIG. 3A, recording data consists of mark periods (in which recording marks are formed) and space periods (in which no recording marks are formed). FIG. 3A illustrates a mark period of 7T. In the recording pulse waveform of the multi-pulse type according to the embodiment of the invention, the mark period has a top pulse and individual pulses of a number corresponding to the length of the mark period. For example, a mark period in a recording pulse waveform corresponding to a 3T mark has a top pulse and one individual pulse. A 4T mark period has a top pulse and two individual pulses, and a 5T mark period has a top pulse and three individual pulses. The 7T mark period shown in FIG. 3A has a top pulse 60 and five individual pulses 61. It is noted that the period including the top pulse 60 and the individual pulses 61 will be collectively referred to as "a multi-pulse period 62" in the following description.

The power level of the recording pulse waveform is any of the following: a laser off level Po (laser output power=0) at which the laser output is off, the read power level Pr for reading the recorded data, the erase power level Pe for erasing recorded data, and the write power level Pw for recording data. As shown in FIG. 3A, during the mark period, the pulses 60 and 61 that constitute the multi-pulse period 62 vary between the read power level Pr and the write power level Pw. After the mark period, a cooling pulse 63 is provided. The cooling pulse 63 corresponds to a period for cooling the disc heated by laser irradiation during the mark period, and its laser power level (hereafter referred to as a "cooling level") Pcl is typically equal to the read power level Pr. During the space period except the cooling pulse period 63, the recording pulse waveform is maintained at the erase power level Pe by the APC control described later.

[Recording/Reproduction Operations]

Now, recording control performed by the recording control unit 10 shown in FIG. 2 using the optical pickup 2 will be described. The recording control unit 10 roughly performs the recording/reproduction control and the APC control.

(I) Recording/Reproduction Control

First, the recording/reproduction control will be described. In the recording operations, the recording level controller 154 in the controller 15 supplies the LD driver 12 with the recording level data S3 for generating currents I2 to I4. The currents I2 to I4 are used to create the erase power level Pe, the write power level Pw, and the cooling level Pcl of the recording pulse waveform shown in FIG. 3A.

Figure 4:
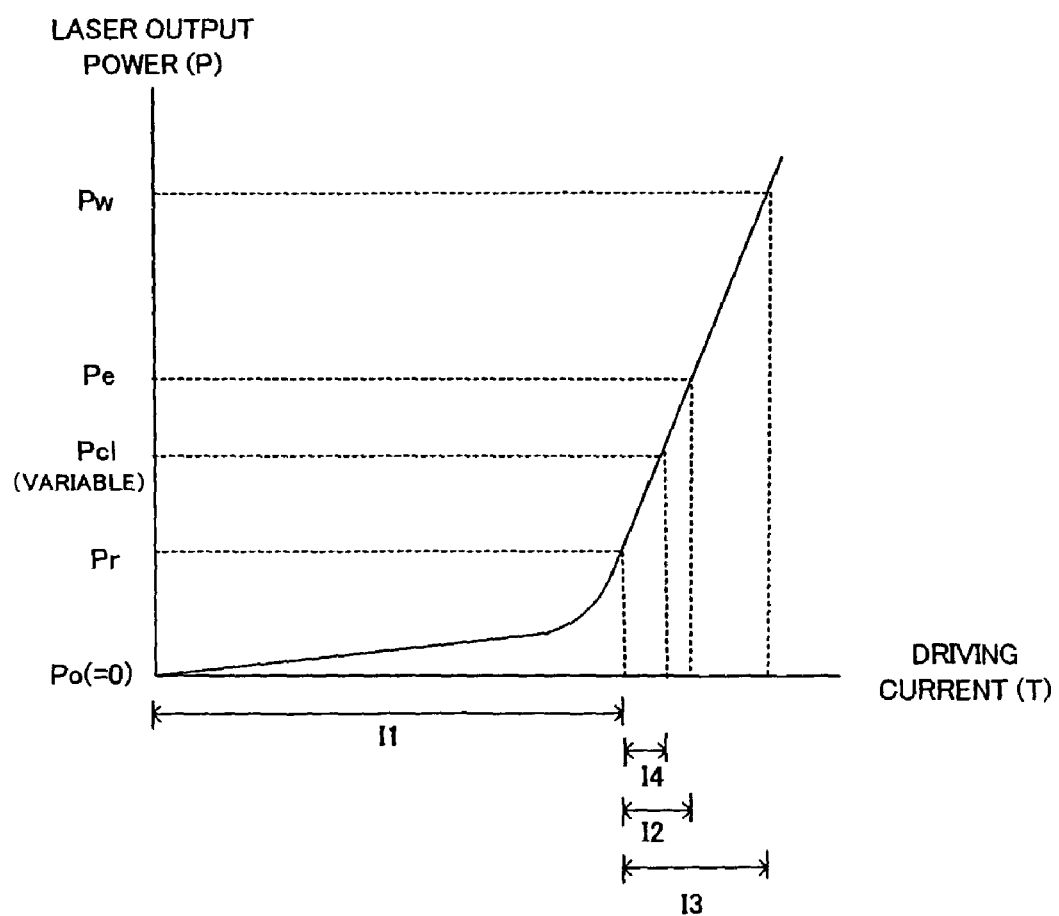
FIG. 4 is a graph showing a laser output characteristic of a laser diode.

FIG. 4 shows relationships between a driving current I supplied to the laser diode 11 and a laser output power P. The read power Pr is obtained by supplying a driving current I1 to the laser diode 11. The erase power Pe is obtained by supplying a driving current (I1+I2) to the laser diode 11, and the write power Pw is obtained by supplying a driving current (I1+I3) to the laser diode 11. Further, the cooling level Pcl is obtained by supplying a driving current (I1+I4) to the laser diode 11.

Out of the recording level signal S3, data for the current I2 is supplied to the D/A converter 123 through the I/F 122 in the LD driver 12. The D/A converter 123 generates a corresponding analog signal, with which it drives the driver 125 to generate the current I2 and supply the current I2 to the switch SW1. Out of the recording level signal S3, data for the current I3 is supplied to the D/A converter 124 through the I/F 122 in the LD driver 12. The D/A converter 124 generates a corresponding analog signal, with which it drives the driver 126 to generate the current I3 and supply the current I3 to the switch SW2. Further, out of the recording level signal S3, data for the current I4 is supplied to the D/A converter 127 through the I/F 122 in the LD driver 12. The D/A converter 127 generates a corresponding analog signal, with which it drives the driver 128 to generate the current I4 and supply the current I4 to the switch SW3.

The switching controller 151 in the controller 15 generates switching signals S1, S2 and S6 based on the recording data. Specifically, the write pulse generator 152 generates a write pulse signal that consists of a plurality of pulse trains based on the recording data shown in FIG. 3A, and supplies the write pulse signal to the LD driver 12 as the switching signal S2. The switching signal generator 153 generates data which falls down to the off-level during the multi-pulse period 62 in the recording data based on the recording data, and supplies the data to the LD driver 12 as the switching signal S1. The cooling period generator 157 generates data indicating the cooling period based on the recording data, and supplies the data to the switch SW3 as the switching signal S6.

In the LD driver 12, the current I1 is supplied from the V/I converter 121 to the laser diode 11. As shown in FIG. 3A, the current I1 defines the read power level Pr of the recording pulse signal.

Referring to FIG. 3A, before the multi-pulse period 62 in the mark period, the switch SW1 is controlled by the switching signal S1 that takes the off-level during the multi-pulse period 62. Therefore, until the multi-pulse period 62 in the mark period, the laser power level is maintained at the erase power level Pe. In addition, during the multi-pulse period 62, the switch SW1 is turned off and prevents the current I2 from being supplied to the laser diode 11. Also in the mark period, the switching signal S2 corresponding to the write pulse signal controls the switch SW2, so that the switch SW2 is switched according to the write pulse signal to allow the current I3 to be cyclically and intermittently supplied to the laser diode 11. As shown in FIG. 3A, this produces the recording pulse waveform in which the level cyclically changes between the read power level Pr (corresponding to only the current I1) and the write power level Pw (corresponding to the current I1+I3) during the multi-pulse period 62.

During the space period, the write pulse generator 152 generates no write pulse. Therefore, the switch SW2 is kept turned off and prevents the current I3 from being supplied to the laser diode 11. The switching signal S1 output from the switch signal generator 153 switches the switch SW1, so that the switch SW1 is kept turned on during the space period and allows the current I2 to be supplied to the laser diode 11. Thus, as shown in FIG. 3A, the recording pulse signal is maintained at the erase power level Pe (corresponding to the current I1+I2) during the space period.

During the period of the cooling pulse 63, both switches SW1 and SW2 are turned off by the switching signal S2 from the write pulse generator 152 and the switching signal S1 from the switching signal generator 153, but the switch SW3 is turned on by the switching signal S6 generated by the cooling period generator 157. Thus, the current I4 is supplied to the laser diode 11, and the level of the recording pulse signal becomes the cooling level Pcl.

During reproduction, the laser diode 11 is supplied with only the current I1, and the recording pulse signal is maintained at the read power level Pr. This allows the recorded data to be reproduced.

(II) APC Control

Next, the APC control will be described. In the case of the APC control with the sample-and-hold circuit, the signals for the APC control are generated during the reproduction and during the space periods at the time of the recording, but not generated during the mark periods at the time of recording. The APC control is performed by the APC loop formed by the laser diode 11, the front monitor diode 16, the buffer 17, the sample-and-hold circuit 14, the APC circuit 13, and the V/I converter 121.

In the case of DVD-RW, during periods in which the APC control is performed, such as the erase power level periods, the level of the bias current I1 supplied to the laser diode 11 by the LD driver 12 is adjusted such that the level of the laser beam emitted by the laser diode 11 is maintained at the erase power level Pe. More specifically, during long space periods (e.g., 5T to 11T and 14T) out of the space periods of the recording data (subjected to 8–16 modulation and having mark periods and space periods of 3T to 11T and 14T in length), the bias current I1 from the LD driver 12 is adjusted such that the eraser power level Pe is maintained constant.

Details of the operations are as follows. The controller 15 generates the recording level signal S3 corresponding to the recording data as described above. The controller 15 drives the LD driver 12 according to the recording level signal S3 and causes the laser diode 11 to emit the laser beam.

The front monitor diode 16, located in proximity to the laser diode 11 in the optical pickup 2, receives the laser beam emitted by the laser diode 11. The front monitor diode 16 generates the laser power level signal S10 indicating the level of the laser beam and supplies the laser power level signal S10 to the sample-and-hold circuit 14 through the buffer 17 The sample-and-hold circuit 14 samples the laser power level signal S10 supplied by the front monitor diode 16 and holds its level for a certain period at the timings defined by the sample-and-hold signal S5 supplied by the APC controller 155 in the controller 15. The sample-and-hold signal S5 output from the controller 15 is a pulse signal indicating a period when a signal for the APC control is to be generated. More specifically, the sample-and-hold signal S5 indicates a certain period (a period during which the APC is performed, and hereafter referred to as an "APC period") in a relatively long space period (5T to 11T) in the recording data. Thus, the sample-and-hold circuit 14 holds the level of the laser power level signal S10 in the APC periods in the space periods of the recording pulse signal and supplies it to the APC circuit 13.

The APC circuit 13 is supplied with the APC target value S4 from the APC controller 155 in the controller 15. The APC target value S4 is a value indicating a level of the laser beam at which the laser beam is to be maintained by the APC. In the present case, the APC target value S4 is a value which corresponds to the erase power level Pe during recording. The APC circuit 13 supplies the control signal S12 to the V/I converter 121 in the LD driver 12 such that the level of the laser power level signal S10 is maintained at a certain level indicated by the APC target value S4 during the APC periods. The V/I converter 121 converts a voltage indicated by the input control signal S12 to a current and outputs the bias current I1. At the same time, the laser diode 11 is also supplied with the current I2 through the switch SW1. Therefore, the laser diode 11 is driven by (I1+I2) during the space period, and the APC loop is configured, such that this output of the laser diode 11 is maintained at the erase power level Pe. If the output level of the laser beam emitted by the laser diode 11 varies due to the temperature variation or other factors, the APC loop operates to vary the bias current I1 in order to compensate for the variation of the output level of the laser beam. As a result, the APC maintains the recording pulse waveform at the erase power level Pe throughout the erase power level periods. Here, I2 is a fixed value corresponding to (Pe–Pr), as seen from FIG. 3A. The output level of the laser diode 11 supplied with only I1 is around Pr.

During reproduction, the APC control maintains the output level of the laser beam at the read power level Pr. Therefore, the APC target value S4 supplied to the APC circuit 13 is a value corresponding to the read power level Pr, and the APC loop operates such that the output level of the laser beam emitted according to the current I1 by the laser diode 11 is equal to the read power level Pr.

[Determining Recording Condition]

Now, the processing for determining the recording condition, which is a characteristic part of the invention, will be described. The information recording and reproducing apparatus of the invention determines an optimum recording condition by performing a test recording prior to the actual recording of information on the disc D.

Figure 5:
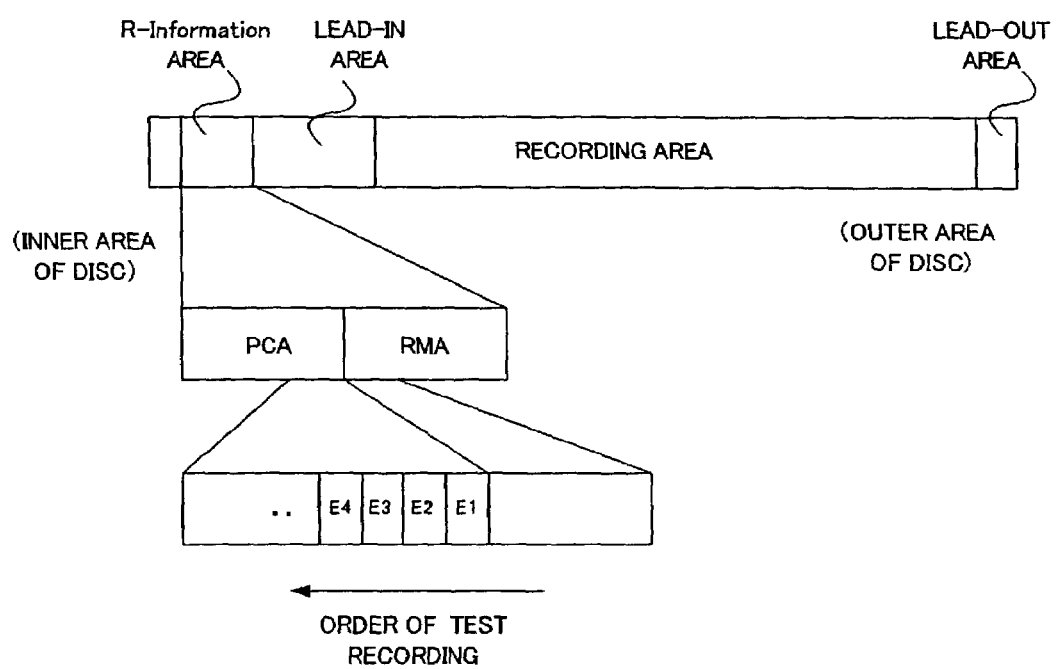
FIG. 5 is a diagram showing a recording format of a disc.

First, areas on the disc D used in the test recording will be described. FIG. 5 schematically shows a recording format of the disc D. The disc D includes an R-Information area, a lead-in area, a recording area and a lead-out area. The R-Information area is for recording various data required for recording on the disc D, and includes PCA (Power Calibration Area) and RMA (Recording Management Area).

The test recording according to the invention is performed in the PCA. Specifically, the test recording is started from the border between the PCA and the RMA in the direction to go backward in respect of address in the PCA (that is, toward the inner circumference of the disc). In the example of FIG. 5, the test recording is performed in the order of the area E1, E2, . . . etc. The reason for performing the test recording in this manner is as follows. Although discs usually have their address information recorded in the LPP within the PCA area, it is sometimes difficult to obtain the address information from the discs. In contrast, the address of the border between the PCA and the RMA can be retrieved from any disc. When performing the test recording, the controller 15 in the information recording and reproducing apparatus temporarily stores a position in the PCA on the disc at which the test recording is started. Then, the controller 15 starts reproduction of the test recorded data from the start position and determines the optimum recording condition as described later. Because the controller 15 stores the position where the test recording is started, it would have no problem in reproducing the test recorded data even if the test recording is not started from the end of the PCA. However, because of the limited amount of the PCA, starting recording of the test data from an arbitrary position for each time could waste the PCA. Therefore, the test recording is performed in order from the border between the PCA and the RMA toward inner area of the disc. Reproducing an area in which the test data has been recorded provides an RF signal, whereas no RF signals are obtained from areas that have no test data. Thus, the first test recording is started from the border between the PCA and the RMA, then the area used for the test recording is reproduced from the border between the PCA and the RMA toward inner tracks of the disc, and the next test recording is performed from a position where no RF signal is detected. In this manner, the PCA can be used in an orderly and efficient manner.

Figure 3B:
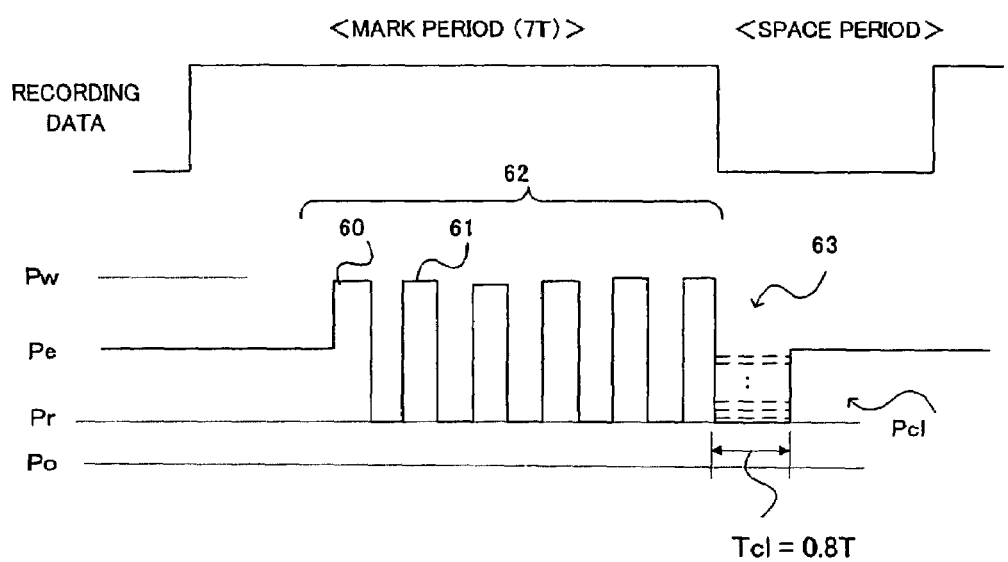

Next, the test recording will be described in detail. According to the invention, the optimum cooling level is determined by performing the test recording while varying the cooling level of the recording pulse signal. FIG. 3B shows an example of varying the cooling level. As previously shown in FIG. 3A, the cooling level Pcl is typically equal to the read power level Pr in a recording pulse signal for DVD-RW. This invention performs the test recording while varying the cooling level Pcl within a certain range between the read power level Pr and the erase power level Pe, and determines the cooling level Pcl that provides a predetermined target asymmetry, as shown in FIG. 3B. The "asymmetry" is a parameter that represents the degree of difference between the center level of the short marks/short spaces and the center level of the long marks/long spaces in a reproduced signal resulting from recording of recording marks/spaces of all lengths 3T to 11T and 14T.

Figure 6:
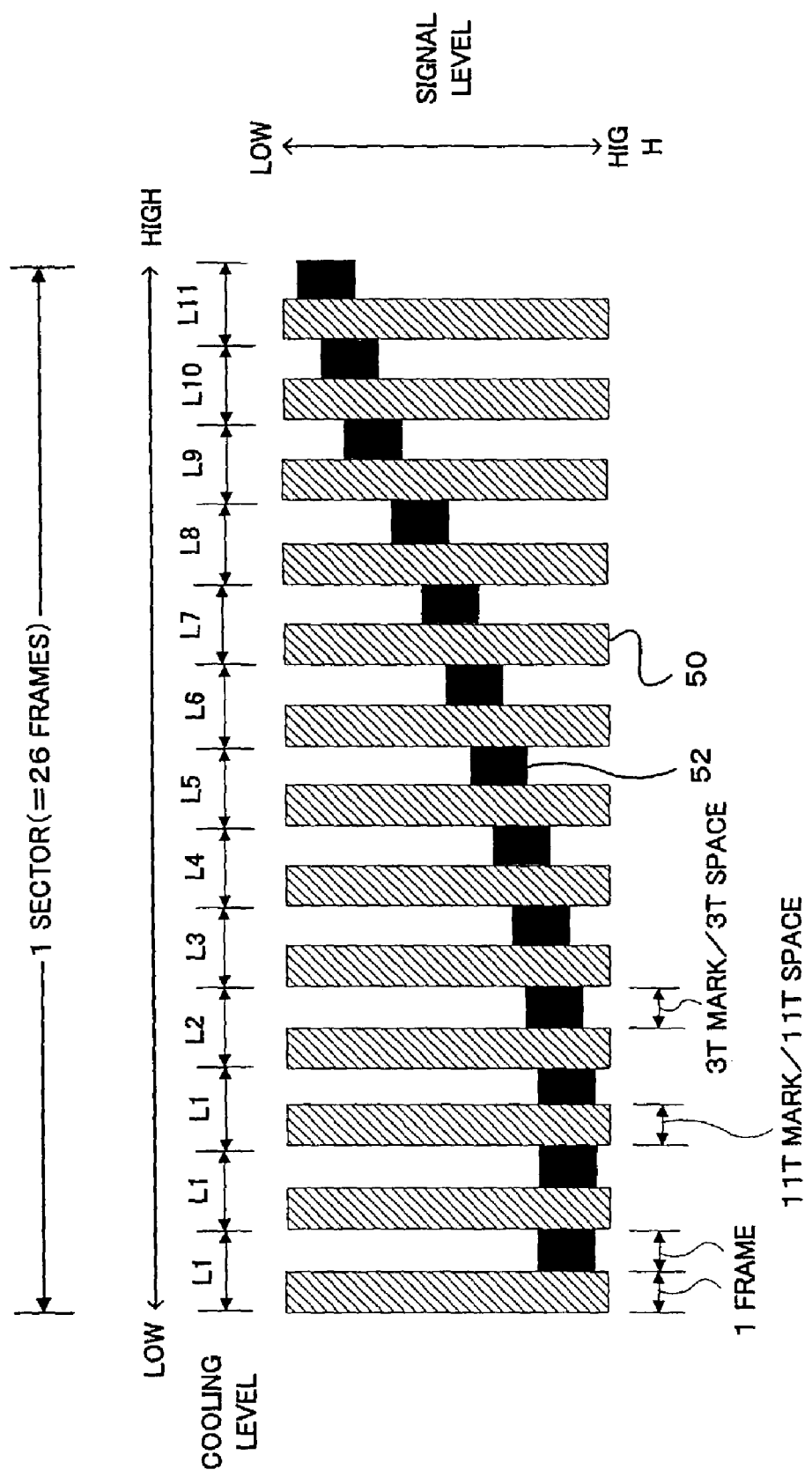
FIG. 6 is a diagram showing an exemplary way of a test recording.

FIG. 6 schematically shows the way to perform the test recording, in which an area for one sector in the PCA is used for one test recording. One sector has 26 frames, and long mark/long space data sections and short mark/short space data sections will be repeatedly recorded in the sector. The example shown in FIG. 6 uses 11T mark/11T space as the long mark/long space, and 3T mark/3T space as the short mark/short space. That is, the 11T mark/11T space data sections and the 3T mark/3T space data sections are alternately recorded in an area for one sector in the PCA. Here, the cooling level of the 11T mark and 3T mark recording data to be recorded is varied as shown in FIG. 3B. The numeral 50 in FIG. 6 schematically represents reproduced waveforms for the test-recorded 11T mark/11T space data sections, including repetition of waveforms corresponding to the 11T marks/11T spaces. The numeral 52 schematically represents reproduced waveforms for the test-recorded 3T mark/3T space data sections, including repetition of waveforms corresponding to the 3T marks/3T spaces. As shown, the test recording is performed in the order from low cooling level to high cooling level. In the test recording, the cooling level is set to the minimum level L1 during the first three cycles of the pair of test recording data sections, and then increased by one for each cycle after the third cycle of the test recording data. Thus, the cooling level is sequentially increased over 11 stages from L1 to L11.

In FIG. 6, the cooling level is fixed at L1 during the first three cycles because the test recording data for the first two cycles is not used in the evaluation in order to eliminate the effect of a transient response in the reproduced signal. When the test recording is performed in the PCA as described above, it is unknown what kind of data has been recorded (or whether there is data recorded or not) just before the start position of the test recording. For example, if there is no data recorded, the reproduction from the position before the start position of the test recording will result in a sudden change of the reproduction signal from no signal level to the level of the reproduced signal of the test recorded data. This will causes a transient response in the reproduced signal. Therefore, when the test recorded data is reproduced, the data for the first two cycles recorded in the test recording is not evaluated but the data for the third and following cycles is evaluated. For this reason, the cooling level of the test recording data is fixed at L1 in the first to third cycles and is thereafter sequentially increased up to the 13th cycle.

The vertical positions of the reproduced waveforms 50 and 52 in FIG. 6 indicate the signal levels. It can be seen that the asymmetry of the 3T mark/3T space recorded data decreases in accordance with the increase in the cooling level of the test recording.

In this manner, the pairs of 11T marks/11T spaces and 3T marks/3T spaces are repeatedly recorded as the test data, frame by frame, in an area for one sector in the PCA with the increased cooling level. Once the test recording is completed, the test recorded data is read out and evaluated for determination of the optimum cooling level.

Next, how to determine the optimum cooling level will be described. The optimum cooling level is a cooling level at which a predetermined target asymmetry value is obtained. That is, an asymmetry value that ensures proper data recording is predetermined, in advance, as the target asymmetry value, and then the cooling level of the recording pulse signal is determined so that the target asymmetry value can be obtained.

Therefore, the test recorded data is reproduced and the asymmetry values are calculated, and then a cooling level that provides the target asymmetry value is determined as the optimum cooling level. In this example, however, as described above, the recording data used for the test recording includes, not all data of 3T to 11T and 14T, but only the data of 3T and 11T for the sake of convenience. In such a case, reproduction of the test recorded data of only 3T and 11T cannot directly provide the asymmetry values. Therefore, in this example, β values are computed from the test recorded data of 3T and 11T, and based on correlations between β values and asymmetry values, an asymmetry value under each test recording condition is evaluated.

Figure 7:
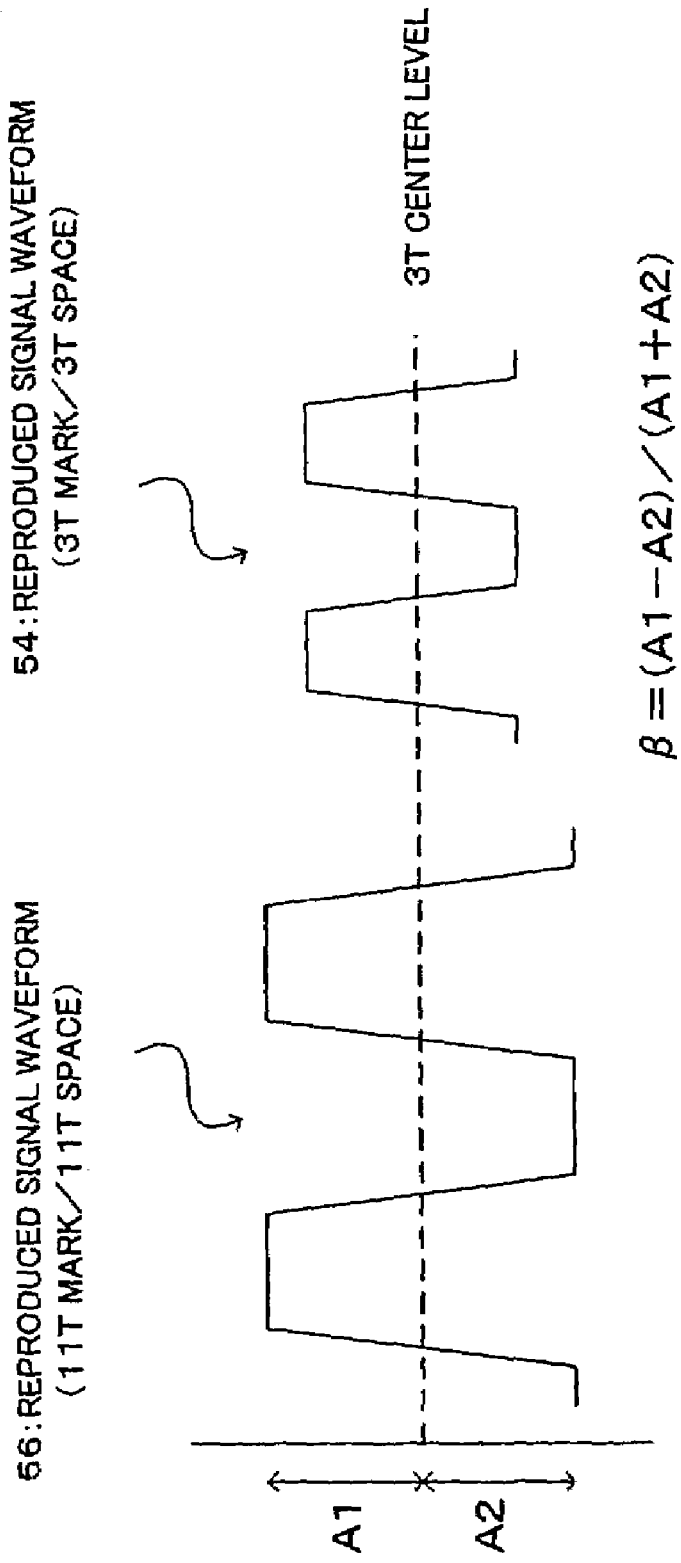
FIG. 7 is a diagram describing the way to compute a β value from reproduced signal waveforms of the test recorded data.

FIG. 7 schematically shows how to compute a β value. FIG. 7 shows reproduced waveforms obtained by reproducing the 11T mark/11T space recorded data and the 3T mark/3T space recorded data recorded in the PCA as shown in FIG. 6. Now, for the reproduced signal waveform 54 obtained by reproducing the 3T mark/3T space recorded data, the center level (the center between the top level and the bottom level) is computed to obtain a 3T center level, such as by an averaging operation. Then, the reproduced signal waveform 56 for the 11T mark/11T space recorded data is evaluated by using the obtained 3T center level as a reference level. That is, a level difference A1 between the top level and the reference level and a level difference A2 between the bottom level and the reference level are computed. The β value is then computed by the equation: $\beta = (A1-A2)/(A1+A2)$.

As can be seen from this equation, the β value represents a difference between the center level of the reproduced signal for the 11T mark/11T space recording data and the center level of the reproduced signal for the 3T mark/3T space recording data, and the β value has a certain correlation with the asymmetry value. For example, a certain disc may involve a correlation such that the asymmetry value varies from 0% to 5% as the β value varies from 0% to 10%. While such a correlation depends on characteristics of each disc used for recording, substantially the same correlation can be applied to the same product model. This correlation is therefore predetermined and stored in the information recording and reproducing apparatus in the form of, for example, a correspondence table of β values and asymmetry values for each model of the disc.

Thus, in evaluation of the test recording, the asymmetry value for each cooling level can be obtained by reproducing the test recorded data, determining the β value for the cooling level, and applying the β value to the predetermined correlations. Then, the cooling level that provides the predetermined target asymmetry value is determined as the optimum cooling level.

In the above example, the level differences A1 and A2 (see FIG. 7) used in the computation of the β value are computed from the peak value and the bottom value that the peak hold and bottom hold circuit obtains from the reproduced signal waveform 56 for the test recorded data of 11T mark/11T space. However, instead of holding the peak and the bottom, the β value may be computed by sampling level values at several points where the reproduced signal waveform 56 is stable. Alternatively, the β value may also be computed based on an averaged signal level obtained by averaging the reproduced signal waveform 56.

[Processing for Determining the Recording Condition]

Figure 8:
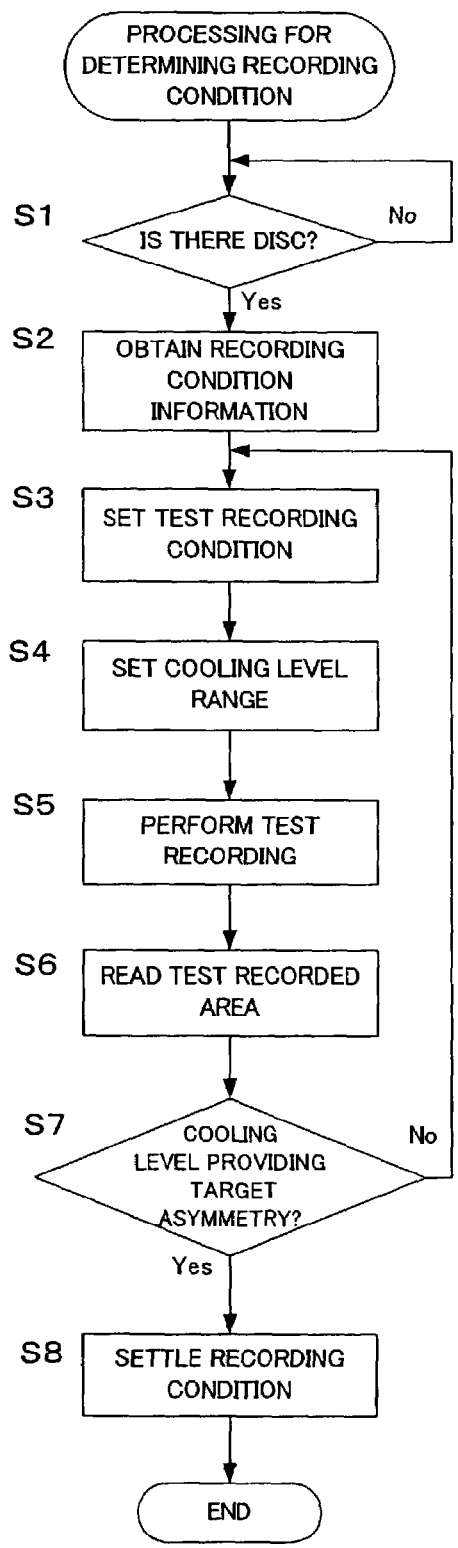
FIG. 8 is a flowchart showing processing for determining a recording condition according to the invention.

Now, the processing for determining the recording condition including the above described test recording will be described with reference to FIG. 8. The processing for determining the recording condition is performed for determining the optimum recording condition for the disc by using the information recording and reproducing apparatus of the invention prior to the actual recording of information on the disc. This processing is essentially performed by the controller 15 in the recording control unit 10 executing a predetermined program.

First, the controller 15 determines whether or not a disc is set in the information recording and reproducing apparatus 1 (step S1). If it is determined that a disc is set, the controller 15 then obtains recording condition information from the disc (step S2). Specifically, if the disc includes recording condition information in its LPPs, the controller 15 may simply read out the recording condition information from the LPPs. Alternatively, the controller 15 may read out a manufacturer ID from the disc and obtain the recording condition information corresponding to the manufacturer ID from recording condition information for various discs stored in the information recording and reproducing apparatus 1. The recording condition information is information such as a write strategy and laser power appropriate for recording of information on the disc. For example, the recording condition information includes information on pulse widths of the top pulse, the individual pulses and the cooling pulse, as well as the power levels of the write power level Pw, the read power level Pr, the erase power level Pe, and so on.

The controller 15 then sets a test recording condition (step S3). Specifically, the controller 15 sets the power levels and the pulse widths obtained in step S2 to the information recording and reproducing apparatus. For a cooling pulse, the controller 15 increases the obtained pulse width of the cooling pulse. For example, if the recording condition information obtained from the disc in step S2 specifies the cooling pulse width of 0.6T, the controller 15 sets a cooling pulse width for the recording data to be used in the test recording to 0.8T. This is done for an efficient and reliable discovery of the cooling level that provides the target asymmetry. The recording condition information recorded on the disc is a condition provided by a manufacturer of the disc, for example, and it can be essentially regarded as the optimum recording condition for the disc. If the target asymmetry is obtained at a cooling level somewhat lower than the cooling level obtained from the disc, starting the test recording at a cooling level thus obtained means varying the cooling level away from the cooling level that really provides the target asymmetry. This will not lead to a discovery of the cooling level that provide the target asymmetry. Therefore, the test recording is started with a cooling pulse slightly wider than that obtained from the disc, and then the cooling level is gradually increased. This allows a sequential test recording starting from a cooling level lower than the cooling level that provides the target asymmetry and ending at a cooling level above that level. Reproducing and evaluating the test recorded data obtained in this manner increases the possibility that the cooling level providing the target asymmetry can be determined.

After setting the test recording condition with the wider cooling pulse width, the controller 15 then determines the range over which the cooling level is varied in the test recording (step S4). In the example shown in FIG. 6, the range over which the cooling level is varied is determined to cover eleven stages of cooling levels from L1.

The controller 15 then performs the test recording as described above according to the test recording condition and the cooling level range determined (step S5). In the test recording, the recording level controller 154 shown in FIG. 2 supplies the signal S3 to the LD driver 12 and gradually increases the current I4 to the laser diode 11 within the cooling level range determined in step S4. Then, the test recording data for the 11T marks/11T spaces and the 3T marks/3T spaces is recorded while the cooling level in the period of the cooling pulse 63 is varied.

The controller 15 then reads the recorded test recorded data to obtain the reproduced signal (step S6) and analyze the result. In the analysis of the result, the controller 15 computes the β value for each cooling level in the manner shown in FIG. 7 based on the reproduced signal and computes the asymmetry value for each cooling level using the above-described correlations between β values and asymmetry values. The controller 15 then determines whether any cooling level provides the predetermined target asymmetry value (step S7). If any cooling level provides the predetermined target asymmetry value, the controller 15 sets the cooling level as the optimum cooling level and settles the recording condition (step S8). Thus, the optimum recording condition for the disc can be determined.

On the other hand, if no cooling level is found that provides the target asymmetry value in step S7, the processing returns to step S3. That is, the controller 15 changes the cooling pulse width again and repeats the processing steps from S3 to S7. The fact that no cooling level was found that provides the target asymmetry value in the first test recording suggests that the cooling level range for that test recording was not appropriate. Therefore, in step S3, the controller 15 further increases or decreases the cooling pulse width, or sets the cooling pulse level to another range, and repeats the test recording. In this manner, the processing steps from S3 to S7 are repeated until the cooling level that provides the target asymmetry value is finally obtained in step S7. If the target asymmetry cannot be obtained in a predetermined times of repetition, the recording condition is settled according to the recording condition information obtained in step S2.

Thus, the information recording and reproducing apparatus of the invention determines the optimum cooling level by performing the test recording while varying the cooling pulse level based on the recording condition obtained from the disc and by analyzing the reproduced signal waveform of the test recorded data. Then, the actual recording of information is performed under the recording condition involving the determined cooling level. Therefore, information can always be recorded under the optimum condition without being affected by difference of actual characteristics of each disc.

[Variations]

In the above-described example, the combination of the 3T marks/3T spaces and the 11T marks/11T spaces is used as the predetermined short marks/short spaces and long marks/long spaces in the test recording. However, the recording data used in the test recording is not limited to this combination. For example, some discs tend to cause a distortion of a reproduced signal for long marks such as 11T marks. For such a disc, the test recording may use, for example, 10T marks/10T spaces or 9T marks/9T spaces as the long marks/long spaces. In that case, the apparatus may store the correlations between β values to be computed from the test recorded data for those marks and asymmetry values, based on which the cooling level that provides the target asymmetry value may be determined.

Alternatively, instead of data for only such particular mark lengths, the test recording may use actual recording data of 3T to 11T and 14T. Then, the asymmetry values may be directly computed from the reproduced signals and evaluated. This approach increases consumption of the PCA on the disc for the test recording, but can directly compute the asymmetry values instead of using the correlations with the β values. Therefore, this approach improves the accuracy in determination of the cooling level that provides the target asymmetry value.

In the above described embodiment, the test recording is performed with varying the cooling power level Pcl within a certain range between the read power level Pr and the erase power level Pe. However, the cooling power level Pcl may be varied out of this range. For example, it may be a value below the read power level Pr. Further, although the width of the cooling power level has been increased in the test recording, it is possible that the width of the cooling power level is not increased in such a case that the cooling power level Pcl is set to a level lower than the read power level Pr. These variations may be adopted in combination as appropriate.

Figure 9:
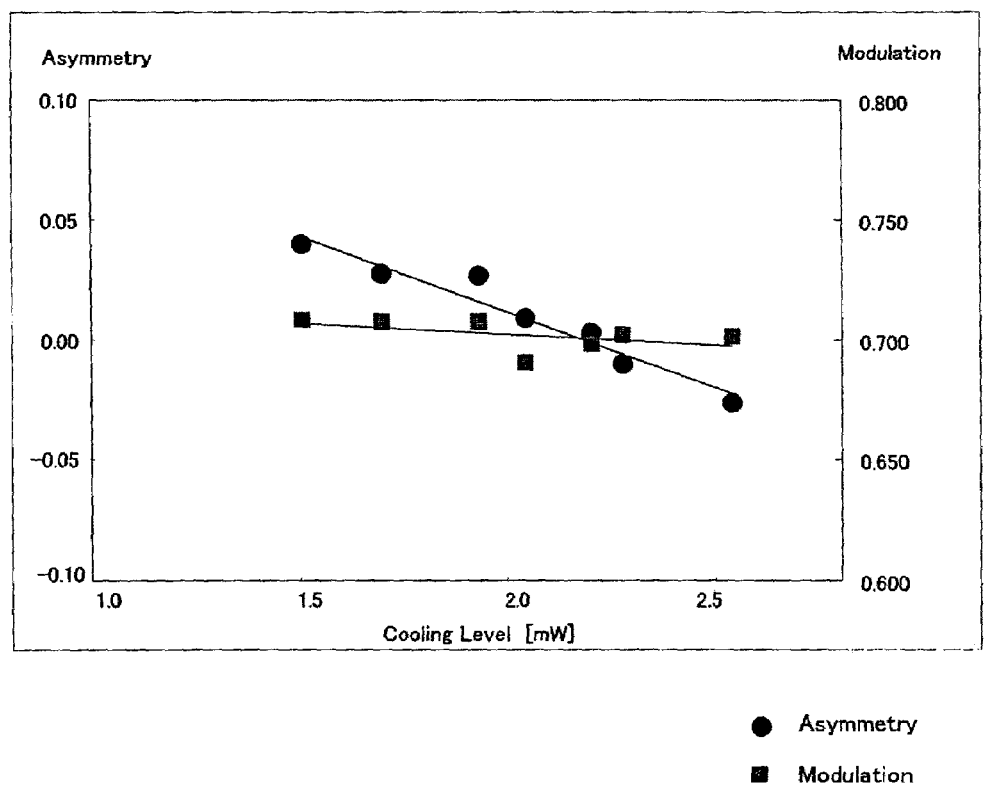
FIG. 9 shows an example of a graph showing the variation of asymmetry and modulation when cooling level is varied.

The test recording in the present invention varies the cooling level. By varying the cooling level, the asymmetry can be varied without varying the modulation of the recording waveform. FIG. 9 shows an example of a graph showing the variation of the asymmetry and the modulation when the cooling level is varied. As can be seen from FIG. 9, when the cooling level is varied, the asymmetry varies, but the modulation maintains almost the constant value. Namely, the test recording according to the present invention enables the determination of the optimum cooling level by varying the asymmetry, without varying the modulation. Therefore, the test recording according to the present invention can be executed after other test recordings, e.g., a test recording for determining an optimum modulation or an optimum recording power, and can be executed together with various test recordings.

Although the embodiment has been described for the DVD-RW, the invention may be applied to other media such as a DVD+RW.

As described above, the invention allows determination of an optimum cooling level by using a test recording. Therefore, recording can always be performed under an optimum condition even if there are variations in characteristics of each information recording and reproducing apparatus, such as in a power adjustment error and pulse emission levels, or if there are differences in characteristics of each disc, or if the disc has a small margin. Further, since the test recording for obtaining the optimum cooling level is performed based on a recording condition specified for each disc, the test recording is performed with reference to an almost proper power and write strategy while varying only the cooling level. This can minimize effects on the recording characteristics.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Applications No. 2002-152038 filed on May 27, 2002 and No. 2003-106903 filed on Apr. 10, 2003 including the specification, claims, drawings and summary is incorporated herein by reference in its entirety.

What is claimed is:

1. An information recording apparatus for irradiating a laser beam onto a recording medium and forming recording marks corresponding to recording data, the apparatus comprising:
   a light source which emits the laser beam; and
   a control unit which generates a recording pulse signal based on the recording data and drives the light source to irradiate the laser pulse onto the recording medium, wherein the control unit comprises:
   a test recording unit which records predetermined test recording data while varying a cooling level, the cooling level being a level of a cooling pulse;
   a reproduction unit which reproduces test recorded data and generates a reproduced signal; and
   a setting unit which determines the cooling level that provides a target asymmetry value based on a waveform of the reproduced signal and sets the cooling level as an optimum cooling level,
   wherein the setting unit comprises:
   a β value computation unit which computes β values from the waveform of the reproduced signal;
   a storage unit which stores correlations between the β values and asymmetry values; and
   a unit for determining a cooling level that provides a target asymmetry value as the optimum cooling level based on the computed β values and the correlations.

2. The information recording apparatus according to claim 1, wherein the β value computation unit computes the β value based on a center level of the reproduced signal waveform for the recorded data of the short mark/short space and a center level of the reproduced signal waveform for the recorded data of the long mark/long space.

3. The information recording apparatus according to claim 1, wherein the test recording unit varies the cooling level from a lower value to a higher value.

4. The information recording apparatus according to claim 1, wherein the test recording unit performs the test recording without varying the cooling level during an initial period of a first predetermined length in the test recording data.

5. The information recording apparatus according to claim 4, wherein, immediately following the initial period in the test recording of data recorded without variation in the cooling level, data for a second period is recorded without varying the cooling level, the second period being of a second predetermined length shorter than the first predetermined length.

6. The information recording apparatus according to claim 1, wherein the recording medium is a DVD-RW, and the test recording unit records the test recording data within a power calibration area of the DVD-RW in order from a border between the power calibration area and a recording management area toward an inner area of the recording medium.

7. An information recording method for irradiating a laser beam onto a recording medium and forming recording marks corresponding to recording data, the method comprising:

a test recording step of recording predetermined test recording data while varying a cooling level, the cooling level being a level of a cooling pulse;

a reproduction step of reproducing the test recorded data and generating a reproduced signal;

a setting step of determining the cooling level that provides a target asymmetry value based on a waveform of the reproduced signal and setting the cooling level as an optimum cooling level; and an information recording step of recording information on the recording medium by generating, based on recording data, a recording pulse signal including the cooling pulse that is set to the optimum cooling level and by driving a light source, wherein the setting step comprises:

a $\beta$ value computation step which computes $\beta$ values from the waveform of the reproduced signal;

a storage step which stores correlations between the $\beta$ values and asymmetry values; and a step for determining a cooling level that provides a target asymmetry value as the optimum cooling level based on the computed $\beta$/values and the correlations.

* * * * *